US010884405B2

(12) United States Patent
Magoni et al.

(10) Patent No.: US 10,884,405 B2
(45) Date of Patent: Jan. 5, 2021

(54) METHOD FOR ASSESSING HEALTH CONDITIONS OF INDUSTRIAL EQUIPMENT

(71) Applicant: ABB Schweiz AG, Baden (CH)

(72) Inventors: Stefano Magoni, Osio Sotto (IT); Luca Cavalli, Bellinzago Lombardo (IT); Simone Turrin, Frankenthal (DE)

(73) Assignee: ABB Schweiz AG, Baden (CH)

( * ) Notice: Subject to any disclaimer, the term of this patent is extended or adjusted under 35 U.S.C. 154(b) by 98 days.

(21) Appl. No.: 16/309,004

(22) PCT Filed: May 16, 2017

(86) PCT No.: PCT/EP2017/061683
§ 371 (c)(1),
(2) Date: Dec. 11, 2018

(87) PCT Pub. No.: WO2017/215864
PCT Pub. Date: Dec. 21, 2017

(65) Prior Publication Data
US 2019/0310621 A1 Oct. 10, 2019

(30) Foreign Application Priority Data
Jun. 13, 2016 (EP) .................................. 16174113

(51) Int. Cl.
*G05B 23/02* (2006.01)
(52) U.S. Cl.
CPC ..... *G05B 23/0283* (2013.01); *G05B 23/0294* (2013.01); *G05B 2223/02* (2018.08)
(58) Field of Classification Search
CPC ............ G05B 23/0283; G05B 23/0294; G05B 2223/02
See application file for complete search history.

(56) References Cited

U.S. PATENT DOCUMENTS

| 7,676,703 B2* | 3/2010 | Uwatoko | G06N 7/005 |
| | | | 714/48 |
| 2005/0196867 A1* | 9/2005 | Bower | G01N 35/00603 |
| | | | 436/43 |

(Continued)

OTHER PUBLICATIONS

European Patent Office, International Search Report & Written Opinion issued in corresponding Application No. PCT/EP2017/061683, dated Aug. 16, 2017, 12 pp.

(Continued)

*Primary Examiner* — Vincent H Tran
(74) *Attorney, Agent, or Firm* — Taft Stettinius & Hollister LLP; J. Bruce Schelkopf (57) ABSTRACT

Method for assessing health conditions of industrial equipment (S), said equipment having one or more determined failure modes ($F_1, \ldots, F_N$), each of said failure modes having one or more determined failure causes ($FC_{D1}, \ldots, FC_{DK}$) and/or one or more undetermined failure causes ($FC_{U1}, \ldots, FC_{UM}$), further comprising: acquiring input data ($D_{IN}$) related to said equipment; calculating failure mode assessment data ($R_{Fi}$, $RUL_{Fi}$, $A_{Fi}$, $RSK_{Fi}$, $POF_{Fi}$) for each failure mode ($F_i$) determined for said equipment, wherein the calculation of said failure mode assessment data comprises: if said failure mode ($F_i$) has one or more determined failure causes ($FC_{D1}, \ldots, FC_{DK}$): executing a first calculation procedure to calculate failure cause assessment data ($R_{FCj}$, $RUL_{FCj}$, $A_{FCj}$) for each failure cause ($FC_{Dj}$) determined for said failure mode, said failure cause assessment data being calculated on the basis of said input data ($D_{IN}$); calculating said failure mode assessment data on the basis of the failure cause assessment data ($R_{FCj}$, $RUL_{FCj}$, $A_{FCj}$) calculated for each failure cause ($FC_{Dj}$) determined for said failure mode; if said failure mode ($F_i$) has one or more undetermined failure causes ($FC_{U1}, \ldots, FC_{UM}$), executing a second calculation procedure to calculate said failure mode (Continued)

assessment data, said failure mode assessment data being calculated on the basis of said input data ($D_{IN}$); calculating a system assessment data ($R_S$, $RUL_S$, $A_S$, $RSK_S$, $POF_S$) for said equipment, said system assessment data being calculated on the basis of said failure mode assessment data ($R_{Fi}$, $RUL_{Fi}$, $A_{Fi}$, $RSK_{Fi}$, $POF_{Fi}$).

20 Claims, 7 Drawing Sheets

(56) References Cited

U.S. PATENT DOCUMENTS

| | | | |
|---|---|---|---|
| 2007/0055660 A1* | 3/2007 | Anderson | H04L 67/06 |
| 2007/0237399 A1* | 10/2007 | Satonaga | G06T 7/0004 |
| | | | 382/225 |
| 2008/0140352 A1 | 6/2008 | Goebel et al. | |
| 2015/0066431 A1* | 3/2015 | Zheng | A61B 6/586 |
| | | | 702/183 |
| 2016/0277260 A1* | 9/2016 | Griffith | H04L 41/147 |

OTHER PUBLICATIONS

European Patent Office, Extended Search Report & Written Opinion issued in corresponding Application No. 16174113.7, dated Jun. 9, 2016, 6 pp.

\* cited by examiner

| Input data | Subset | Examples |
|---|---|---|
| Nameplate data | Customer Data<br>Manufacturer Data | Manufacturer, breaker type, rating, production date, etc. |
| Application data | Customer Data<br>Manufacturer Data<br>User Entries | Industry, application, owner, operator, location, breaker criticality, etc. |
| Life and Maintenance data | Customer Data | Installation date, delivery date, maintenance date, maintenance actions, etc. |
| Monitoring data | Customer Data | Continuous monitoring data, non-continuous monitoring data, etc. |
| Operational data | Customer Data | Load, trip current, switching frequency, etc. |
| Environmental data | Customer Data | Temperature, humidity, pollution, etc. |
| Reliability Statistics data | Manufacturer Data<br>External Data | Failure rate, distribution function, distribution parameters, etc. |
| Recommended Action data | Manufacturer Data | Preventive maintenance actions related to particular values of the product or health conditions, etc. |
| Reference Values | Manufacturer Data | Reference threshold values for warning/alarm related to condition monitoring data, etc. |
| Parameters | User entries | Operation time window, etc. |

METHOD FOR ASSESSING HEALTH CONDITIONS OF INDUSTRIAL EQUIPMENT

BACKGROUND

The present invention relates to a method for assessing health conditions of industrial equipment. The method according to the invention is particularly suitable for performing a health assessment of a low, medium or high voltage electric apparatus or system, e.g. a switching device, a switchgear, an electric power distribution grid and the like.

For the purposes of the present invention:
the term "low voltage" (LV) relates to operating voltages at electric power distribution level, which are lower than 1 kV AC and 1.5 kV DC;
the term "medium voltage" (MV) relates to operating voltages at electric power distribution level, which are higher than 1 kV AC and 1.5 kV DC up to some tens of kV, e.g. up to 72 kV AC and 100 kV DC;
the term "high voltage" (HV) relates to operating voltages at electric power transmission level, which are higher than some tens of kV, e.g. higher than 72 kV AC and 100 kV DC.

As is known, currently available methods for performing a health assessment of industrial equipment are basically of two types: time-based assessment methods and condition-based assessment methods.

Typically, time-based assessment methods calculate the conditional probability of failure of the equipment within a predefined time window, given the age thereof.

Such a conditional probability of failure, which is generally calculated for all the failure modes potentially leading to a failure of the equipment, represents a measure of the health conditions of said equipment.

Time-based assessment methods are generally based on the statistical analysis (life data analysis) of the equipment lifetime and do not take into account the actual usage and degradation history of the equipment.

It has been seen that this may lead to a large inaccuracy in the assessment activity, when the equipment usage and degradation history deviates significantly from the statistical average for the class of systems including the considered equipment.

Further, these methods do not often provide accurate indications on possible preventive maintenance activities to be carried out to avoid or reduce the occurrence of failures in the equipment.

Condition-based assessment methods typically assess health conditions of the equipment by processing monitoring data, which are related to the actual operating conditions of said equipment. Such an assessment is generally carried out by means of model-based and/or data-driven algorithms.

As they are based on the processing of monitoring data related to the actual usage and degradation history of the equipment, these methods are particularly suitable to implement condition-based maintenance policies.

Unfortunately, differently from the above mentioned time-based assessment methods, these methods generally analyze only few possible failure modes potentially leading to a failure of the equipment.

Further, they allow assessing health conditions of industrial equipment only on the basis of the operating status of components or groups of components for which said monitoring data are available.

It has been seen that both these critical aspects may lead to a large inaccuracy in the assessment activity.

In addition, current condition-based assessment methods typically provide no information on the accuracy of their assessment data and on how to improve this latter.

In the state of the art, it is therefore quite felt the need for technical solutions that are capable of overcoming the technical issues described above, thereby providing high levels of accuracy in assessing current or future health conditions of industrial equipment, identifying failures in said equipment and providing reliable information on possible preventive maintenance actions to avoid potential failures in said equipment.

SUMMARY

In order to respond to this need, the present invention provides a method for assessing health conditions of industrial equipment, according to the following claim 1 and the related dependent claims.

In a general definition, the method, according to the invention, comprises the following steps:
acquiring input data related to the equipment;
calculating failure mode assessment data for each failure mode determined for said equipment, wherein the calculation of said failure mode assessment data comprises:
if said failure mode has one or more determined failure causes:
executing a first calculation procedure to calculate failure cause assessment data for each failure cause determined for said failure mode, said failure cause assessment data being calculated on the basis of said input data;
calculating said failure mode assessment data on the basis of the failure cause assessment data calculated for each failure cause determined for said failure mode;
if said failure mode has one or more undetermined failure causes, executing a second calculation procedure to calculate said failure mode assessment data, said failure mode assessment data being calculated on the basis of said input data;
calculating system assessment data for said equipment, said system assessment data being calculated on the basis of said failure mode assessment data.

BRIEF DESCRIPTION OF THE FIGURES

Further characteristics and advantages of the method, according to the present invention, will become more apparent from the detailed description of preferred embodiments illustrated only by way of non-limitative example in the accompanying drawings, in which.

DETAILED DESCRIPTION

Referring to the cited figures, the present invention is related to a method 1 for assessing health conditions of industrial equipment S.

In principle, the equipment S may be any industrial apparatus or system having components or group of components interacting one with another.

Preferably, the equipment S is a LV, MV or HV electric apparatus or system, such as a LV, MV or HV switching device, switchgear, electric power distribution grid and the like.

In general, the method, according to the invention, is based on the following theoretical assumptions:
- any industrial equipment may be subject to a failure;
- one or more mutually exclusive "failure modes" concur to cause a failure of said equipment;
- one or more mutually exclusive failure causes concur to be at the origin of each failure mode.

Within the frame of the present invention, a "failure mode" of industrial equipment is defined as a determinable operating way, in which said equipment is subject to a failure.

As an example, in a MV circuit breaker, a failure mode may be the following:
"the electric poles of the circuit breaker are no more able to interrupt short-circuit currents when opening their electric contacts".

According to another possible approach (which is complementary to the one mentioned above), a "failure mode" of industrial equipment is defined as a determinable component or group of components of said equipment, which may be subject to a failure.

As an example, in a MV circuit breaker, possible failure modes may be the following:
"the electric poles of the circuit breaker" or "the actuating mechanism of the movable electric contacts of the circuit breaker".

One or more failure modes may be determined for a given equipment.

Such failure modes are assumed to be mutually exclusive and statistically independent in the sense that any failure of said equipment is assumed to be caused by only one of said failure modes, thereby excluding the others.

In practice, the failure modes of industrial equipment are assumed to "compete" one with another to cause the failure of said equipment.

Within the frame of the present invention, a "failure cause" for industrial equipment is defined as a determinable or undeterminable physical phenomenon or technical circumstance, which may be at the origin of a given failure mode determined for said equipment.

As an example, referring again a MV circuit breaker and to its possible failure mode mentioned above, possible failure causes at the origin of such a failure mode may be:
"wear phenomena involving the electric contacts"; or
"an unbalanced transmission of mechanical forced through the kinematic chain actuating the movable contacts".

For some failure modes, which has been determined for industrial equipment, one or more failure causes may be determined.

In this case, the determined failure causes are assumed to be mutually exclusive in the sense that the corresponding failure mode is caused by only one of said failure causes, thereby excluding the others.

In practice, the failure causes referred to a given failure mode are assumed to "compete" one with another to be at the origin of a given failure mode.

Other failure modes, which has been determined for industrial equipment, may be however be originated by undeterminable failure causes that cannot be identified with certainty or somehow monitored.

In view the above, it can be easily understood that, for the equipment S, one or more failure modes are determinable while each of said one or more failure modes may have one or more determinable failure causes or one or more undeterminable failure causes.

Figure 1:
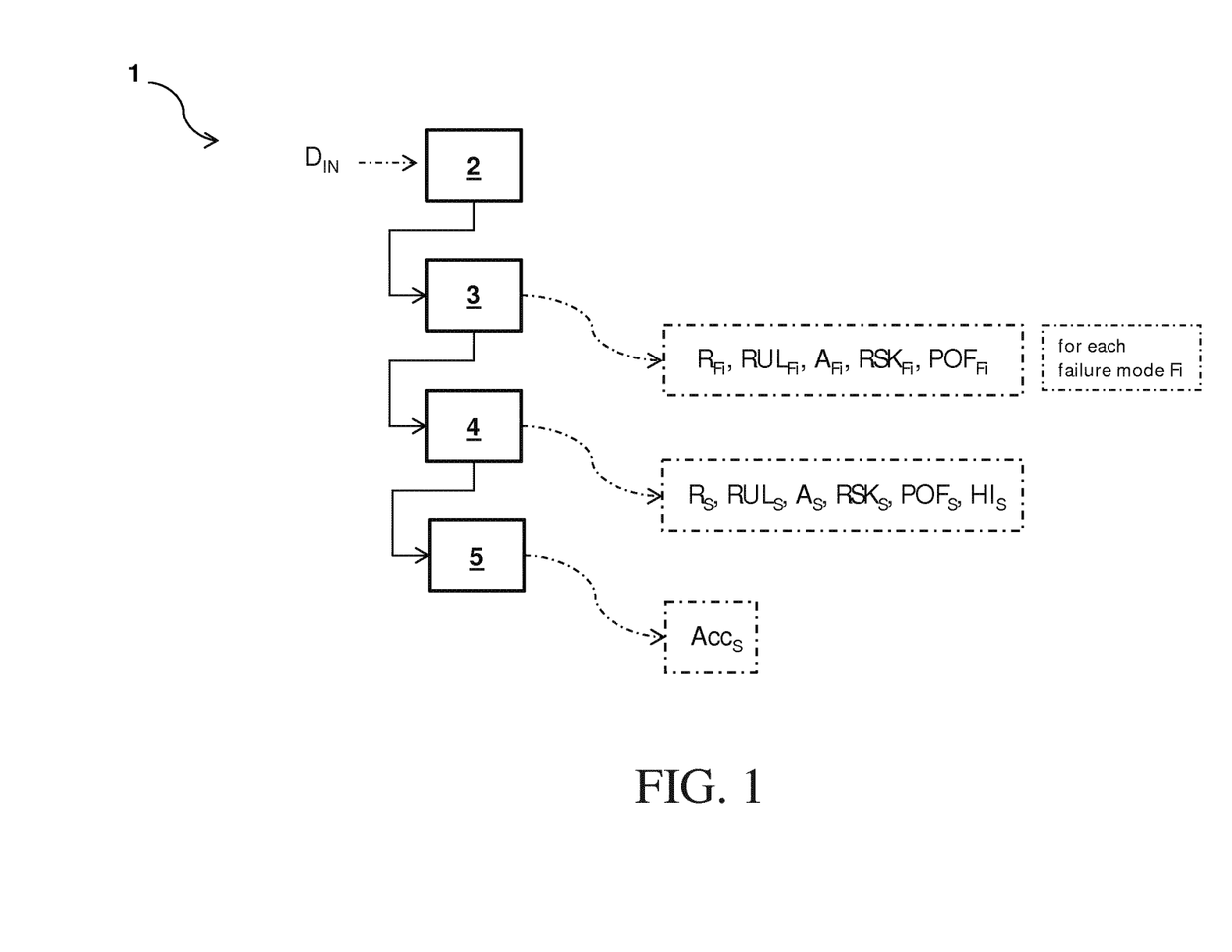
FIGS. 1-7 are block diagrams that schematically show the method, according to the present invention.
Figure 2:
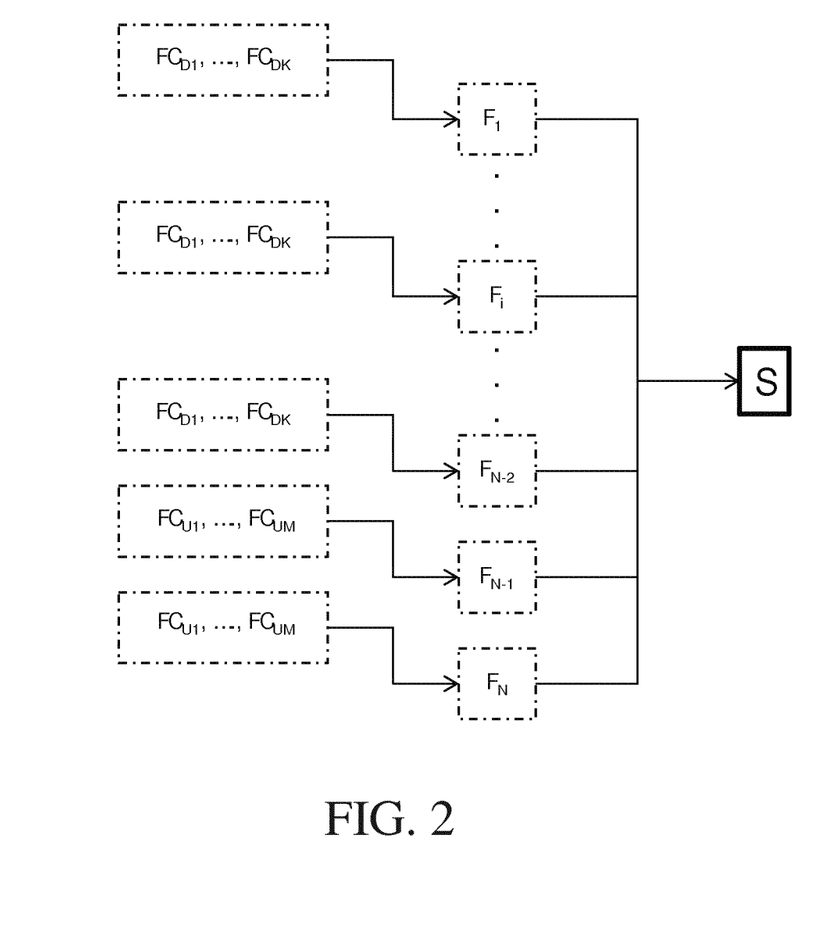

According to the invention, the equipment S has one or more determined failure modes $F_1, \ldots, F_N$, each having in turn one or more determined failure causes $FC_{D1}, \ldots, FC_{DK}$ and/or one or more undetermined failure causes $FC_{U1}, \ldots, FC_{UM}$ (FIG. 2).

Preferably, the failure modes of the equipment S and, when possible, one or more failure causes $FC_{D1}, \ldots, FC_{DK}$ related to one or more failure modes are predetermined, e.g. established when the equipment S is installed on the field depending on the characteristics of the equipment itself.

Said predetermined failure modes and/or failure causes of the equipment S may be updated, when necessary, during the operating life of the equipment S.

According to the invention, the method 1 comprises a step 2 of acquiring input data $D_{IN}$ related to the equipment S.

The input data $D_{IN}$ may be data related to the specific equipment S of interest. In addition or in alternative, the input data $D_{IN}$ may include data related to the class of equipment including the equipment S (e.g. data related to the family of MV circuit breakers including a specific circuit breaker of interest).

The input data $D_{IN}$ may be provided by different sources and their nature may depend on the type of the equipment S, on the managing policies adopted for the equipment S, on the maintenance policies adopted for the equipment S, and the like.

As an example, the input data $D_{IN}$ may include various subsets of data, e.g. customer data, manufacturer data, user data and external data.

Figure 3:
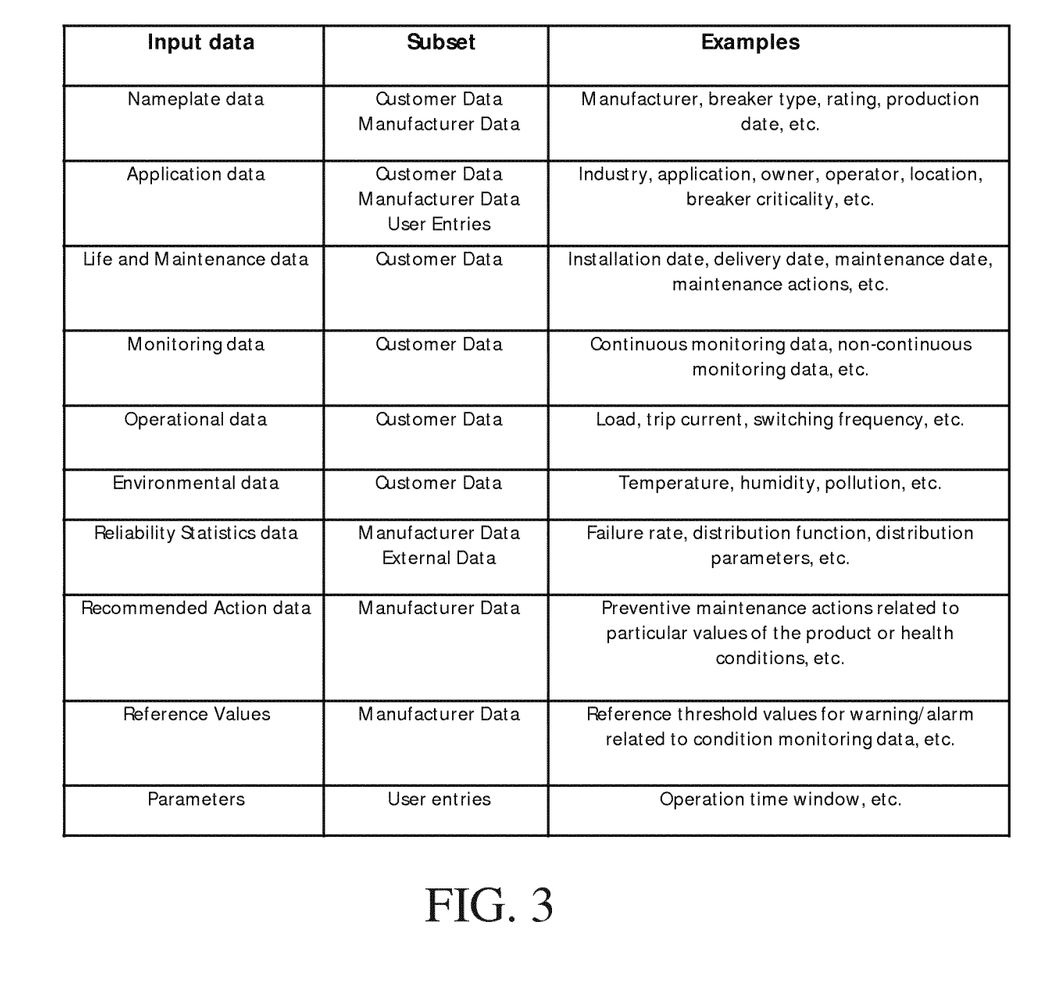

Examples of information included in each subset of data, in the exemplary case in which the equipment S is a MV circuit breaker, are reported in the table of FIG. 3.

Of course, the input data $D_{IN}$ preferably include information on the failure modes $F_1, \ldots, F_N$ and on possible failure causes $FC_{D1}, \ldots, FC_{DK}$ determined for the equipment S.

However, the input data $D_{IN}$ may include different combinations and subsets of data with respect to those mentioned above.

According to the invention, the method 1 comprises a step 3 of calculating failure mode assessment data $R_{Fi}$, $RUL_{Fi}$, $A_{Fi}$, $RSK_{Fi}$, $POF_{Fi}$ for each failure mode $F_i$ determined for the equipment S.

Preferably, a set of said failure mode assessment data calculated for a i-th failure mode $F_i$ comprises:
- a first failure mode assessment value $R_{Fi}$ indicative of the reliability of the failure mode $F_i$. The value $R_{Fi}$ is the probability that the failure mode $F_i$ does not lead to a failure in the equipment S within a specified operation time window;
- a second failure mode assessment value $RUL_{Fi}$ indicative of the remaining useful life of the equipment S in relation to the failure mode $F_i$. The value $RUL_{Fi}$ can be considered as an intervention time window to prevent the occurrence of a failure in relation to the failure mode $F_i$ in the equipment S. In this case, said intervention time window can be defined as the time interval within which to execute an intervention action on the equipment S to prevent a failure in relation to the failure mode $F_i$;
- a third failure mode assessment value $A_{Fi}$ indicative of a recommended intervention action on the equipment S to prevent the occurrence of a failure in relation to the failure mode $F_i$ in the equipment S;
- a fourth failure mode assessment value $POF_{Fi}$ indicative of a probability that the failure mode $F_i$ leads to a failure in the equipment S within the above operation time window;

a fifth failure mode assessment value $RSK_{Fi}$ indicative of a risk of failure for the equipment S in relation to the failure mode $F_i$.

Figure 4:
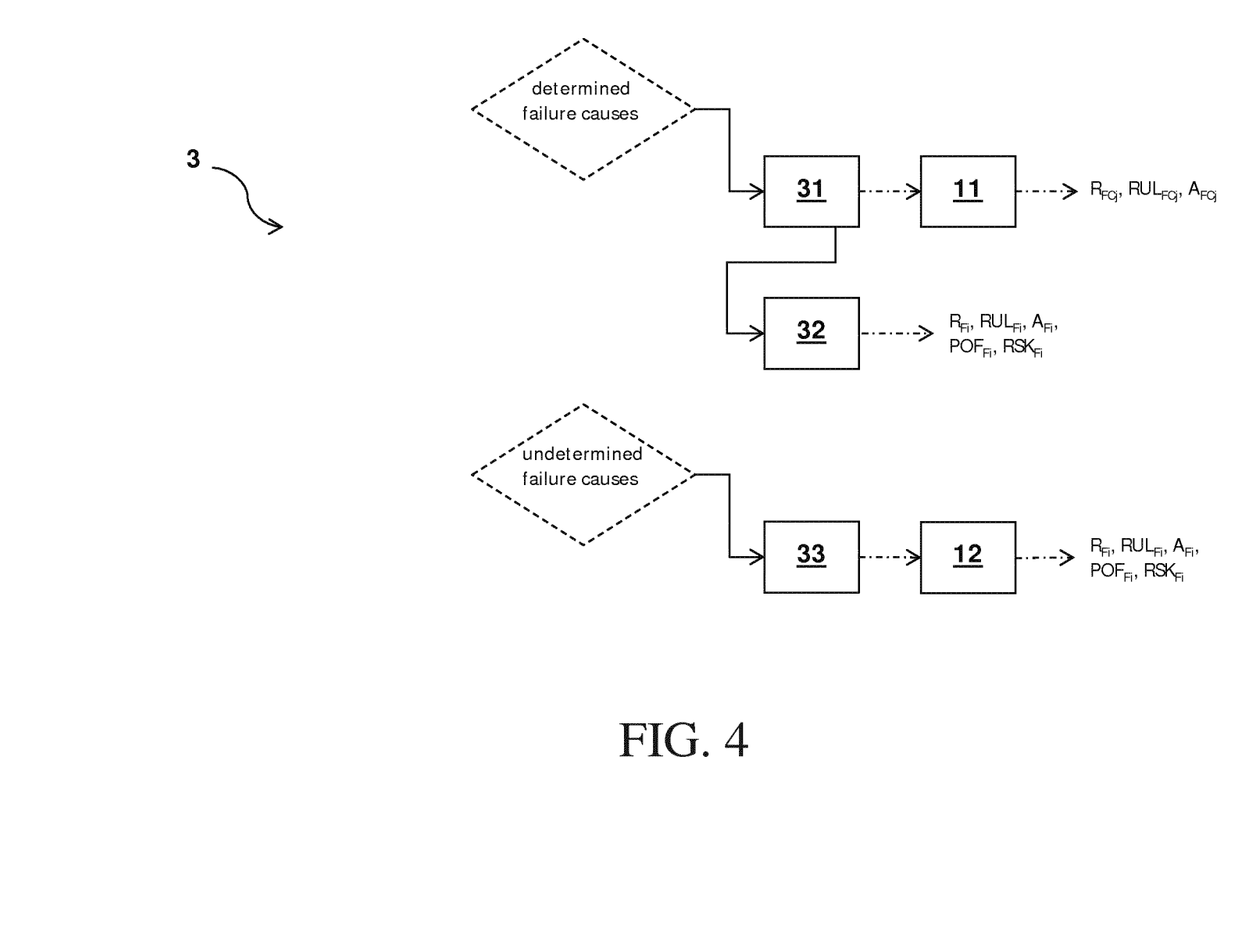

The calculation of the failure mode assessment data $R_{Fi}$, $RUL_{Fi}$, $A_{Fi}$, $POF_{Fi}$, $RSK_{Fi}$ for each failure mode $F_i$ depends on whether the failure mode $F_i$ has determined failure causes $FC_{D1}$, $FC_{DK}$ or undetermined failure causes $FC_{U1}$, ..., $FC_{UM}$ (FIG. 4).

If a i-th failure mode $F_i$ has one or more determined failure causes $FC_{D1}$, ..., $FC_{DK}$, the method 1 comprises a step 31 of executing a first calculation procedure 11 to calculate failure cause assessment data $R_{FCj}$, $RUL_{FCj}$, $A_{FCj}$ for each failure cause $FC_{Dj}$ determined for the failure mode $F_i$.

The failure cause assessment data $R_{FCj}$, $RUL_{FCj}$, $A_{FCj}$ are calculated for each determined failure cause on the basis of the input data $D_{IN}$.

Preferably, a set of failure cause assessment data calculated for the j-th determined failure cause $FC_{Dj}$ comprises:
- a first failure cause assessment value $R_{FCj}$ indicative of a probability that the failure cause $FC_{Dj}$ does not lead to a failure in the equipment S within the above operation time window;
- a second failure mode assessment value $RUL_{FCj}$ indicative of an intervention time window $T_{MA}$ to prevent the occurrence of the failure cause $FC_{Dj}$ in the equipment S. In this case, said intervention time window can be defined as the time interval within which to execute an intervention action to prevent the occurrence of the failure cause $FC_{Dj}$ in the equipment S;
- a third failure mode assessment value $A_{FCj}$ indicative of a recommended intervention action on the equipment S to prevent the occurrence of the failure cause $FC_{Dj}$ in the equipment S.

Following the execution of the calculation procedure 11 for each failure cause $FC_{Dj}$ determined for a i-th failure mode $F_i$, the method 1 comprises a step 32 of calculating the failure mode assessment data $R_{Fi}$, $RUL_{Fi}$, $A_{Fi}$, $RSK_{Fi}$, $POF_{Fi}$ for the failure mode $F_i$ on the basis of the failure cause assessment data $R_{FCj}$, $RUL_{FCj}$, $A_{FCj}$ calculated for each failure cause $FC_{Dj}$ determined for said failure mode.

Preferably, each of the failure mode assessment values $R_{Fi}$, $RUL_{Fi}$, $A_{Fi}$, $RSK_{Fi}$, $POF_{Fi}$ are calculated on the basis of the failure cause assessment values $R_{FCj}$, $RUL_{FCj}$, $A_{FCj}$ calculated for each determined failure cause $FC_{Dj}$ related to the failure mode $F_i$.

Preferably, the first failure mode assessment value $R_{Fi}$ for the failure mode $F_i$ is calculated as:

$$R_{Fi} = R_{FC1} * R_{FC2} * \ldots * R_{FCk}$$

where $R_{FC1}$, $R_{FC2}$, ..., $R_{FCk}$ are the first failure cause assessment values $R_{FC}$ calculated for each failure cause $FC_{D1}$, $FC_{D2}$, ..., $FC_{DK}$ determined for the failure mode $F_i$, according to the first calculation procedure 11.

If some failure causes are not statistically independent, correlation factors modeling the statistically dependency of the failure causes must be considered in the above relation.

Preferably, the second failure mode assessment value $RUL_{Fi}$ for the failure mode $F_i$ is calculated as:

$$RUL_{Fi} = \min[RUL_{FC1}, RUL_{FC2}, \ldots, RUL_{FCk}]$$

where $RUL_{FC1}$, $RUL_{FC2}$, ..., $RUL_{FCk}$ are the second failure cause assessment values $RUL_{FC}$ calculated for each determined failure cause $FC_{D1}$, $FC_{D2}$, ..., $FC_{DK}$ determined for the failure mode $F_i$, according to the first calculation procedure 11.

Preferably, the third failure mode assessment value $A_{Fi}$ is given by the recommended action $A_{FCj}$ associated to the determined failure cause $F_{CDj}$, which has the minimum second failure cause assessment value $RUL_{FCj}$ among all the determined failure causes $FC_{D1}$, $FC_{D2}$, ..., $FC_{DK}$ related to the failure mode $F_i$.

Preferably, the action $A_{FCj}$ is included in the input data $D_{IN}$.

Preferably, the fourth failure mode assessment value $POF_{Fi}$ for the failure mode $F_i$ is calculated as:

$$POF_{Fi} = 1 - R_{Fi}$$

where $R_{Fi}$ is the above first failure mode assessment value related to the failure mode $F_i$.

Preferably, the fifth failure mode assessment value $RSK_{Fi}$ for the failure mode $F_i$ is calculated as:

$$RSK_{Fi} = POF_{Fi} * C_{Fi}$$

where $POF_{Fi}$ is the above fourth failure mode assessment value and $C_{Fi}$ is a cost value associated to the failure mode $F_i$, which is indicative of the overall cost of a failure of the equipment S when said failure is due to the failure mode $F_i$.

Preferably, the cost value $C_{Fi}$ is included in the input data $D_{IN}$.

If a i-th failure mode $F_i$ has undetermined failure causes $FC_{U1}$, ..., $FC_{UM}$, the method 1 comprises the step 33 of executing a second calculation procedure 12 to calculate the failure mode assessment data $R_{Fi}$, $RUL_{Fi}$, $A_{Fi}$, $RSK_{Fi}$, $POF_{Fi}$ for the failure mode $F_i$.

In this case, the failure mode assessment data $R_{Fi}$, $RUL_{Fi}$, $A_{Fi}$, $RSK_{Fi}$, $POF_{Fi}$ are calculated on the basis of said input data $D_{IN}$.

According to the invention, following the calculation of the failure mode assessment data $R_{Fi}$, $RUL_{Fi}$, $A_{Fi}$, $POF_{Fi}$, $RSK_{Fi}$ for each failure mode $F_i$, the method 1 comprises a step 4 of calculating system assessment data $R_S$, $RUL_S$, $A_S$, $RSK_S$, $POF_S$, $HI_S$ for the equipment S.

Said set of system assessment data is calculated on the basis of the failure mode assessment data $R_{Fi}$, $RUL_{Fi}$, $A_{Fi}$, $RSK_{Fi}$, $POF_{Fi}$ calculated for each failure mode $F_i$.

Preferably, said set of system assessment data calculated comprises:
- a first system assessment value $R_S$ indicative of the reliability of the equipment S. The value $R_S$ is the probability that a failure does not occur in the equipment S within a specified operation time window;
- a second system assessment value $RUL_S$ indicative of the remaining useful life of the equipment S. The value $RUL_S$ can be considered as an intervention time window to prevent the occurrence of a failure in the equipment S. In this case, said intervention time window can be defined as the time interval within which to execute an intervention action to prevent the occurrence of a failure in the equipment S;
- a third system assessment value $A_S$ indicative of a recommended intervention action on the equipment S to prevent the occurrence a failure in the equipment S;
- a fourth failure mode assessment value $POF_S$ indicative of a probability that a failure occurs within the above operation time window;
- a fifth system assessment value $RSK_S$ indicative of a risk of failure for the equipment S;
- a sixth system assessment value $HI_S$ indicative of the health level of the equipment S.

Preferably, each of the system assessment values $R_S$, $RUL_S$, $A_S$, $RSK_S$, $POF_S$, $HI_S$ are calculated on the basis of the failure mode assessment values $R_{Fi}$, $RUL_{Fi}$, $A_{Fi}$, $RSK_{Fi}$, $POF_{Fi}$ calculated for each failure mode $F_1, \ldots, F_N$.

Preferably, the first system assessment value $R_S$ for the equipment S is calculated as:

$$R_S = R_{F1} * R_{F2} * \ldots * R_{FN}$$

where $R_{F1}, R_{F2}, \ldots, R_{FN}$ are the first failure mode assessment values calculated for each failure mode of the equipment S.

If some failure modes are not statistically independent, correlation factors modeling the statistically dependency of the failure causes must be considered in the above relation.

Preferably, the second system mode assessment value $RUL_S$ for the equipment S is calculated as:

$$RUL_S = \min[RUL_{F1}, RUL_{F2}, \ldots, RUL_{FN}]$$

where $RUL_{F1}, RUL_{F2}, \ldots, RUL_{FN}$ are the second failure mode assessment values calculated for each failure mode of the equipment S.

Preferably, the third system assessment value $A_S$ for the equipment S is given by the recommended action associated to the failure mode $F_i$, which has the minimum second failure mode assessment value $RUL_{Fi}$ among all the determined failure modes $F_1, \ldots, F_N$ of the equipment S.

Preferably, the action code $ACT_S$ is included in the input data $D_{IN}$.

Preferably, the fourth system assessment value $POF_S$ for the equipment S is calculated as:

$$POF_S = 1 - R_S$$

where $R_S$ is the above first system assessment value related to the equipment S.

Preferably, the fifth system assessment value $RSK_S$ for the equipment S is calculated as:

$$RSK_S = POF_S * C_S$$

where $POF_S$ is the above fourth system assessment value and $C_S$ is a cost value associated a failure of the equipment S.

Preferably, the cost value $C_S$ is included in the input data $D_{IN}$.

Preferably, the sixth system assessment value $HI_S$ for the equipment S is calculated by comparing the above fourth system assessment value $POF_S$ with predefined first threshold values and assigning predefined numbers or codes to the sixth system assessment value $HI_S$ on the basis of said comparison.

As an example:

if $POF_S < 3\%$, then $HI_S = 1$;

if $3\% <= POF_S <= 7\%$, then $HI_S = 2$;

if $POF_S > 7\%$, then $HI_S = 3$.

Preferably, the control procedure 11 executed for each determined failure cause $FC_{Dj}$ related to a i-th failure mode $F_i$ comprises different calculation sessions depending on whether monitoring data CMD, NCMD related to the operating status of the equipment S are available or not.

As reported in FIG. 3, possible monitoring data CMD, NCMD processed during the control procedure 11 are preferably comprised, if available, in the input data $D_{IN}$ acquired at the acquisition step 2 described above.

If monitoring data CMD, NCMD related to the operating life of the equipment S are not available, the control procedure 11 comprises the step 111 of selecting first reliability statistics data REL1 related to the operating life of the equipment S.

As it may be derived from the table of FIG. 3, the first reliability statistics data REL1 are preferably comprised in the input data $D_{IN}$ acquired at the acquisition step 2 described above. Examples of reliability statistics data are reported in the table of FIG. 3 as well.

Then, the control procedure 11 comprises the step 112 of executing a first calculation session 21 to calculate the failure cause assessment data $R_{FCj}$, $RUL_{FCj}$, $A_{FCj}$ for the j-th failure cause $FC_{Dj}$ on the basis of the first reliability statistics data REL1.

Figure 5:
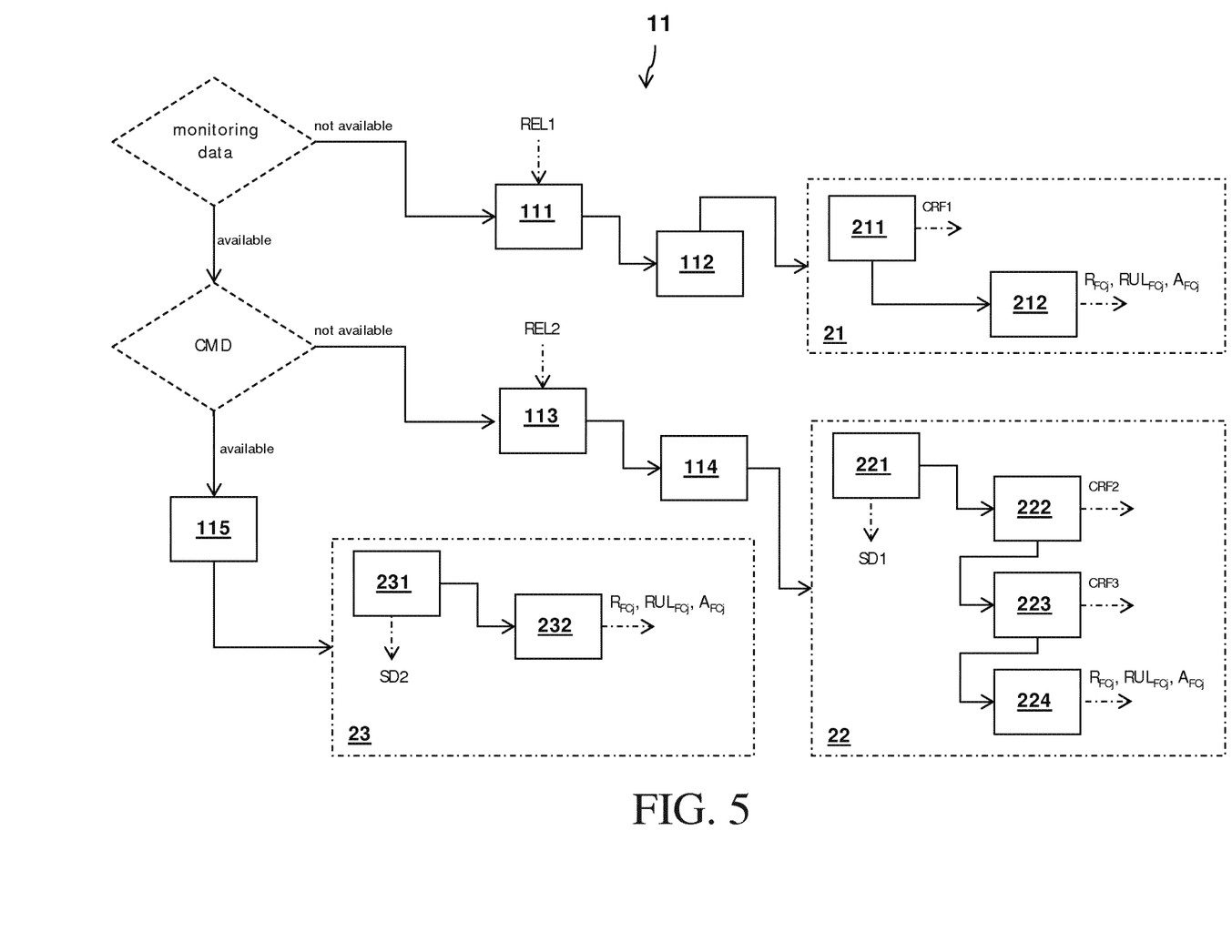
Figure 6:
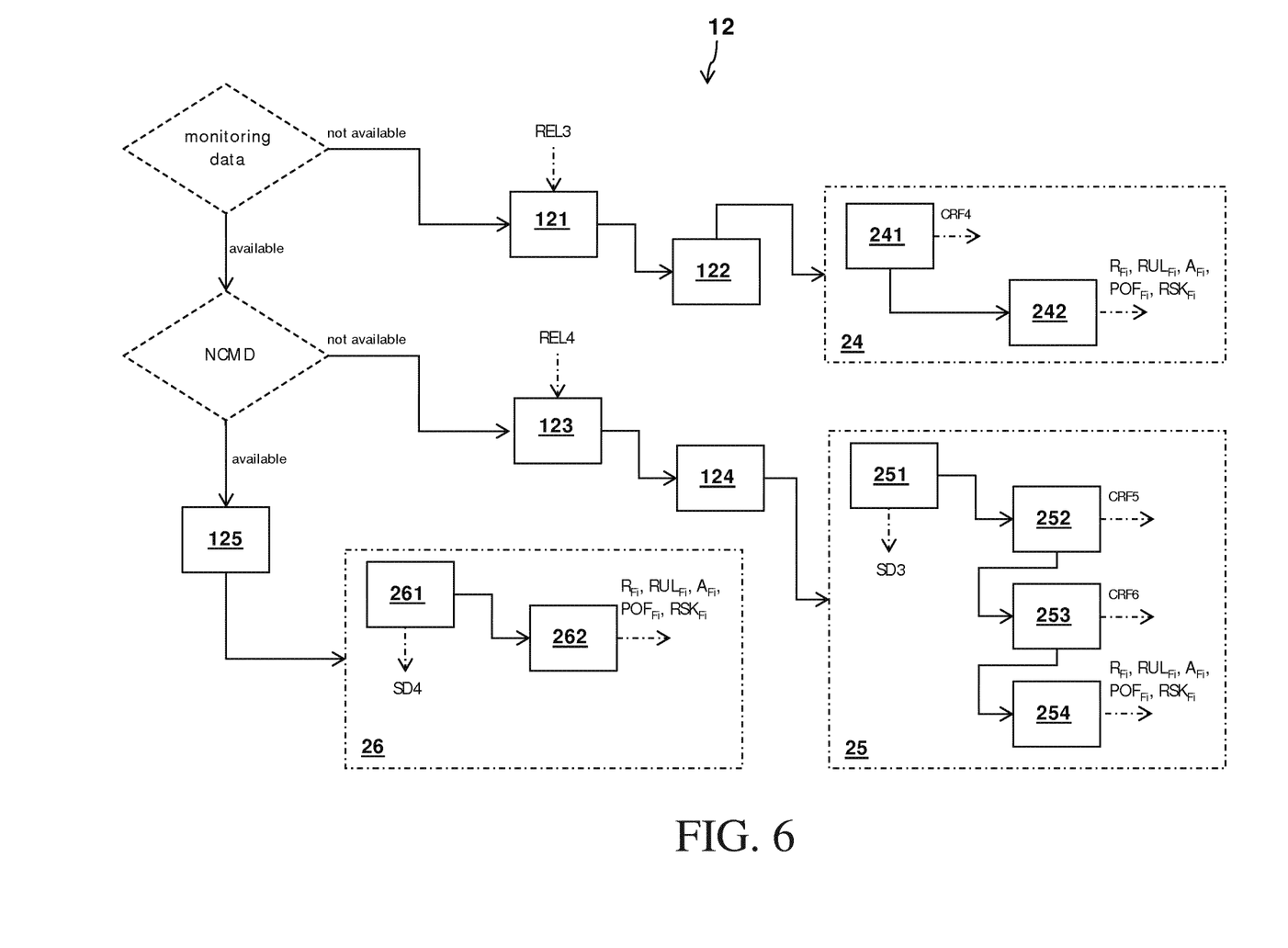
Figure 7:
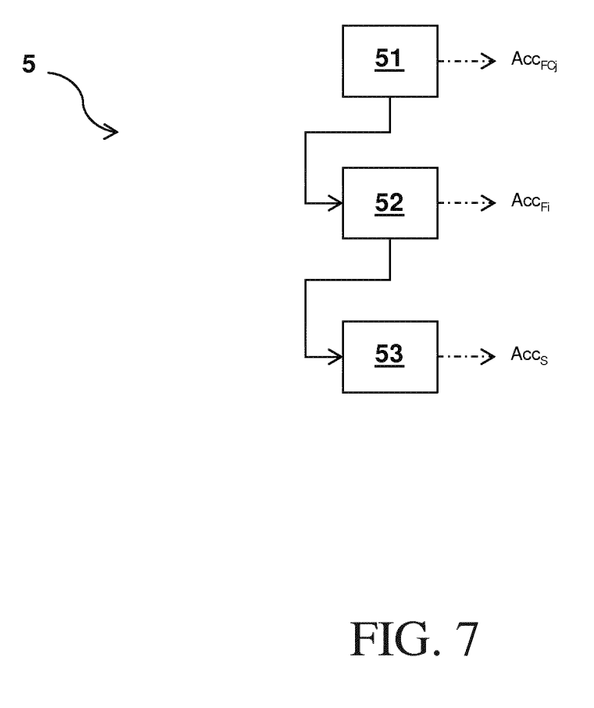

Preferably, the first calculation session 21 comprises a step 221 of calculating a first conditional reliability function CRF1 for the j-th failure cause $FC_{Dj}$ under consideration on the basis of the first reliability statistics data REL1 and the step 222 of calculating the failure cause assessment data $R_{FCj}$, $RUL_{FCj}$, $A_{FCj}$ on the basis of said first conditional reliability function CRF1.

As an example, the first conditional reliability function CRF1 may be derived from a Weibull function of the type:

$$R(t) = \exp[-(t/\alpha)^\beta]$$

(where $\alpha$ is the scale parameter and $\beta$ is the shape parameter) by applying a formula for the determination of a conditional reliability function CRF as given by:

$$CRF(\tau | t) = P(T > t + \tau | T > t) = \frac{P(T > t + \tau)}{P(T > t)} = \frac{R(t + \tau)}{R(t)}$$

where T is the current age of the equipment and $\tau$ is a time with $\tau > T$.

The conditional reliability function for the j-th failure cause values $FC_{Dj}$, $R_{FCj}$ is given by the value of the function CRF1 for a time equal to the above operation time window. The value $RUL_{FCj}$ is calculated as the mean of the conditional probability density function obtained by deriving the conditional reliability function CRF1.

Preferably, the value $A_{FCj}$ is instead included in the input data $D_{IN}$ and can be selected on the base of the other failure cause assessment values.

If monitoring data CMD, NCMD related to the operating life of the equipment S are available, the control procedure 11 preferably comprises different calculation sessions depending on the available type of monitoring data.

The available monitoring data, in fact, may comprise continuous monitoring data CMD or non-continuous monitoring data NCMD related to the operating status of the equipment S.

Advantageously, the continuous monitoring data CMD are data related to the operating status of the equipment S, which are provided by a detection arrangement (e.g. including suitable sensors or detection devices) capable of collecting data related to the operating status of the equipment S in a continuous manner (e.g. cyclically at given detection instants or as a consequence of an event) during the operation of the equipment S, whereas the non-continuous monitoring data NCMD are data related to the operating status of the equipment S, which are provided by a detection arrangement capable of collecting data related to the operating status of the equipment S only when it is activated to perform a test on the operating status of the equipment S.

If continuous monitoring data CMD related to the operating life of the equipment S are not available, the calculation procedure 11 comprises the step 113 of selecting second reliability statistics data REL2 related to the operating life of the equipment S.

The second reliability statistics data REL2 are preferably comprised in the input data $D_{IN}$ acquired at the acquisition step 2 described above.

Then, the control procedure 11 comprises the step 114 of executing a second calculation session 22 to calculate the failure cause assessment data $R_{FCj}$, $RUL_{FCj}$, $A_{FCj}$ for the j-th failure cause $FC_{Dj}$ under consideration on the basis of the second reliability statistics data REL2 and on the basis of the non-continuous monitoring data NCMD comprised in the available monitoring data.

Preferably, the second calculation session 22 comprises the step 221 of calculating first status data SD1 related to the operating status of the equipment S of the base of the non-continuous monitoring data NCMD.

A first diagnostic algorithm comparing the non-continuous monitoring data NCMD with predefined second threshold values may be advantageously adopted to calculate the status data SD1.

The calculation of the first status data SD1 is aimed at obtaining a quantitative information on the actual status of the equipment S, thereby taking into account possible degradation phenomena of the performances provided by the equipment S.

Preferably, the second calculation session 22 comprises the step 222 of calculating a second conditional reliability function CRF2 for the j-th failure cause $FC_{Dj}$ under consideration on the basis of the second reliability statistics data REL2.

Also the second conditional reliability function CRF2 may be a Weibull function of the type illustrated above.

Preferably, the second calculation session 22 comprises the step 223 of calculating a third conditional reliability function CRF3 for the j-th failure cause $FC_{Dj}$ under consideration.

Also the third conditional reliability function CRF3 may be a Weibull function of the type illustrated above.

Preferably, the third conditional reliability function CRF3 is calculated by modifying said second conditional reliability function CRF2 on the basis of the first status data SD1.

In practice, the second conditional reliability function CRF2 is translated (or more generally transformed) using the first status data SD1 in order to take into consideration the actual operating conditions of the equipment S.

Preferably, the second calculation session 22 comprises the step 224 of calculating the failure cause assessment data $R_{FCj}$, $RUL_{FCj}$, $A_{FCj}$ for the failure cause $FC_{Dj}$ under consideration on the basis of said third conditional reliability function CRF3.

The failure cause assessment data $R_{FCj}$, $RUL_{FCj}$, $A_{FCj}$ may be obtained from the third conditional reliability function CRF3 in a way similar to the example described above with reference to the first conditional reliability function CRF1.

If continuous monitoring data CMD related to the operating life of said equipment are available, the calculation procedure 11 comprises the step 115 of executing a third calculation session 23 to calculate the failure cause assessment data $R_{FCj}$, $RUL_{FCj}$, $A_{FCj}$ for the j-th failure cause $FC_{Dj}$ under consideration on the basis of said continuous monitoring data.

Preferably, the third calculation session 23 comprises the step 231 of calculating second status data SD2 related to the operating status of the equipment S of the base of the non-continuous monitoring data CMD.

A second diagnostic algorithm comparing the continuous monitoring data CMD with predefined third threshold values may be advantageously adopted to calculate the status data SD2.

Also in this case, the calculation of the status data SD2 is aimed at obtaining a quantitative information on the actual status of the equipment S, thereby taking into account possible degradation phenomena of the performances provided by the equipment S.

Preferably, the third calculation session 23 comprises the step 232 of calculating the failure cause assessment data $R_{FCj}$, $RUL_{FCj}$, $A_{FCj}$ for the j-th failure cause $FC_{Dj}$ under consideration on the basis of the second status data SD2.

A first prognostic algorithm using Monte-Carlo simulations and/or descriptive statistics calculations may be advantageously adopted to calculate the failure cause assessment data $R_{FCj}$, $RUL_{FCj}$, $A_{FCj}$.

Preferably, the control procedure 12 comprises different calculation sessions depending on whether monitoring data CMD, NCMD related to the operating status of the equipment S are available or not.

If monitoring data CMD, NCMD related to the operating life of the equipment S are not available, the control procedure 12 comprises the step 121 of selecting third reliability statistics data REL3 related to the operating life of the equipment S.

The third reliability statistics data REL3 are preferably comprised in the input data $D_{IN}$ acquired at the acquisition step 2 described above.

Then, the control procedure 12 comprises the step 122 of executing a fourth calculation session 24 to calculate the failure mode assessment data $R_{Fi}$, $RUL_{Fi}$, $A_{Fi}$, $RSK_{Fi}$, $POF_{Fi}$ for the i-th failure node $F_i$ under consideration on the basis of the third reliability statistics data REL3.

Preferably, the fourth calculation session 24 comprises a step 241 of calculating a fourth conditional reliability function CRF4 for the i-th failure mode $F_i$ under consideration on the basis of the third reliability statistics data REL3 and the step 242 of calculating the failure mode assessment data $R_{Fi}$, $RUL_{Fi}$, $A_{Fi}$, $RSK_{Fi}$, $POF_{Fi}$ on the basis of said fourth conditional reliability function.

Also the fourth conditional reliability function CRF4 may be a Weibull function of the type illustrated above.

The failure mode assessment data $R_{Fi}$, $RUL_{Fi}$, $A_{Fi}$, $RSK_{Fi}$, $POF_{Fi}$ may be obtained from the fourth conditional reliability function CRF4 in a way similar to the example described above with reference to the first conditional reliability function CRF1.

If said monitoring data CMD, NCMD related to the operating life of the equipment S are available, the control procedure 12 preferably comprises different calculation sessions depending on the available type of monitoring data.

If continuous monitoring data CMD related to the operating life of said equipment are not available, the calculation procedure 12 comprises the step 123 of selecting fourth reliability statistics data REL4 related to the operating life of the equipment S.

The fourth reliability statistics data REL4 are preferably comprised in the input data $D_{IN}$ acquired at the acquisition step 2 described above.

Then, the control procedure 12 comprises the step 124 of executing a fifth calculation session 25 to calculate the failure mode assessment data $R_{Fi}$, $RUL_{Fi}$, $A_{Fi}$, $RSK_{Fi}$, $POF_{Fi}$ for the i-th failure node $F_i$ under consideration on the basis of the fourth reliability statistics data REL4 and on the basis of the non-continuous monitoring data NCMD comprised in the available monitoring data.

Preferably, the fifth calculation session 25 comprises the step 251 of calculating third status data SD3 related to the operating status of the equipment S of the base of the non-continuous monitoring data NCMD.

A third diagnostic algorithm comparing the non-continuous monitoring data NCMD with predefined fourth threshold values may be advantageously adopted to calculate the status data SD3.

The calculation of the first status data SD3 is aimed at obtaining a quantitative information on the actual status of the equipment S, thereby taking into account possible degradation phenomena of the performances provided by the equipment S.

Preferably, the fifth calculation session 25 comprises the step 252 of calculating a fifth conditional reliability function CRF5 for the i-th failure mode $F_i$ under consideration on the basis of the fourth reliability statistics data REL4.

Also the fifth conditional reliability function CRF5 may be a Weibull function of the type illustrated above.

Preferably, the fifth calculation session 25 comprises the step 253 of calculating a sixth conditional reliability function CRF6 for the i-th failure mode under consideration.

Also the sixth conditional reliability function CRF6 may be a Weibull function of the type illustrated above.

Preferably, the sixth conditional reliability function CRF6 is calculated by modifying said fifth conditional reliability function CRF5 on the basis of the status data SD3.

In practice, the fifth conditional reliability function CRF5 is translated (or more generally transformed) using the third status data SD3 in order to take into consideration the actual operating conditions of the equipment S.

Preferably, the fifth calculation session 25 comprises the step 254 of calculating the failure mode assessment data $R_{Fi}$, $RUL_{Fi}$, $A_{Fi}$, $RSK_{Fi}$, $POF_{Fi}$ for the i-th failure node $F_i$ under consideration on the basis of said sixth conditional reliability function CRF6.

The failure mode assessment data $R_{Fi}$, $RUL_{Fi}$, $A_{Fi}$, $RSK_{Fi}$, $POF_{Fi}$ may be obtained from the sixth conditional reliability function CRF6 in a way similar to the example described above with reference to the first conditional reliability function CRF1.

If continuous monitoring data CMD related to the operating life of said equipment are available, the calculation procedure 12 comprises the step 125 of executing a sixth calculation session 26 to calculate the failure mode assessment data $R_{Fi}$, $RUL_{Fi}$, $A_{Fi}$, $RSK_{Fi}$, $POF_{Fi}$ for the i-th failure node $F_i$ under consideration on the basis of said continuous monitoring data.

Preferably, the sixth calculation session 26 comprises the step 261 of calculating fourth status data SD4 related to the operating status of the equipment S of the base of the non-continuous monitoring data CMD.

A fourth diagnostic algorithm comparing the continuous monitoring data CMD with predefined fifth threshold values may be advantageously adopted to calculate the status data SD4.

Also in this case, the calculation of the status data SD4 is aimed at obtaining a quantitative information on the actual status of the equipment S, thereby taking into account possible degradation phenomena of the performances provided by the equipment S.

Preferably, the third calculation session 26 comprises the step 262 of calculating the failure mode assessment data $R_{Fi}$, $RUL_{Fi}$, $A_{Fi}$, $RSK_{Fi}$, $POF_{Fi}$ for the i-th failure node $F_i$ under consideration on the basis of the fourth status data SD4.

A second prognostic algorithm using Monte-Carlo simulations and/or descriptive statistics calculations may be advantageously adopted to calculate the failure mode assessment data $R_{Fi}$, $RUL_{Fi}$, $A_{Fi}$, $RSK_{Fi}$, $POF_{Fi}$.

In a preferred embodiment, the method 1 comprises also the step 5 of calculating accuracy data $Acc_S$ indicative of the accuracy of the system assessment data $R_S$, $RUL_S$, $A_S$, $RSK_S$, $POF_S$, $HI_S$ described above.

Preferably, the accuracy data $Acc_S$ are calculated only when monitoring data NCMD, CMD (non-continuous or continuous) related to the operating life of the equipment S are available.

The calculation of the accuracy data $Acc_S$ is based on the calculation of accuracy data $Acc_{FCj}$ indicative of the accuracy of said failure cause assessment data $R_{FCj}$, $RUL_{FCj}$, $A_{FCj}$ and on the calculation of accuracy data $Acc_{Fi}$ indicative of the accuracy of said failure mode assessment data $R_{Fi}$, $RUL_{Fi}$, $A_{Fi}$, $RSK_{Fi}$, $POF_{Fi}$.

The calculation of the accuracy data $Acc_{FCj}$, $Acc_{Fi}$ is in turn based on the accuracy of the diagnostic algorithms adopted to calculate the status data SD1, SD2, SD3, SD4 described above.

The accuracy of such diagnostic algorithms is known per se and it is an information advantageously included in the input data $D_{IN}$.

The step 5 of calculating the accuracy data $Acc_S$ comprises a step 51 of calculating an accuracy value $Acc_{FCj}$ for each determined failure cause $FC_{Dj}$ taken into consideration during the calculation of the system assessment data $R_S$, $RUL_S$, $A_S$, $RSK_S$, $POF_S$, $HI_S$ described above. The accuracy value $Acc_{FCj}$ for each failure cause $FC_{Dj}$ may be calculated as:

$$Acc_{FCj} = DA_{FCj} * POF_{FCj}$$

where $POF_{FCj} = (1 - R_{FCj})$ is a value indicative of a probability that said determined failure cause $FC_{Dj}$ occurs within the above operation time window and $DA_{FCj}$ is the accuracy of the diagnostic algorithms used to calculate the failure cause assessment data $R_{FCj}$, $RUL_{FCj}$, $A_{FCj}$ related to the determined failure cause $FC_{Dj}$.

The step 5 of calculating the accuracy data $Acc_S$ comprises a step 52 of calculating an accuracy value $Acc_{Fi}$ for each failure mode $F_i$ taken in to consideration during the calculation of the system assessment data $R_S$, $RUL_S$, $A_S$, $RSK_S$, $POF_S$, $HI_S$ described above.

The accuracy value $Acc_{Fi}$ for each failure mode $F_i$ may be calculated as:

$$Acc_{Fi} = DA_{Fi} * POF_{Fi}$$

where $POF_{Fi}$ is the fourth failure mode assessment value calculated for the failure mode $F_i$ and $DA_{Fi}$ is the accuracy value of the diagnostic algorithms used to calculate the failure mode assessment data $R_{Fi}$, $RUL_{Fi}$, $A_{Fi}$, $RSK_{Fi}$, $POF_{Fi}$ related to the failure mode $F_i$.

The step 5 of calculating data accuracy $Acc_S$ comprises a step 53 of calculating an accuracy value $Acc_S$ indicative of the accuracy of the system assessment data $R_S$, $RUL_S$, $A_S$, $RSK_S$, $POF_S$, $HI_S$ described above on the basis of the accuracy value $Acc_{Fi}$, $Acc_{FCj}$ respectively calculated for each failure mode $F_i$ and each failure cause $FC_{Dj}$ taken into consideration during the calculation of said system assessment data.

The accuracy value $Acc_S$ may be calculated as the sum of the accuracy values $Acc_{Fi}$, $Acc_{FCj}$ calculated for each failure cause $FC_j$ and for each failure mode $F_i$ taken into consideration during the calculation of the system assessment data $R_S$, $RUL_S$, $A_S$, $RSK_S$, $POF_S$, $HI_S$ described above.

The method, according to the invention, is particularly suitable to be implemented by a computerised arrangement.

In a further aspect, the present invention thus relates to a computer program comprising software instructions to carry out the method, according to the invention.

Said computer program is stored or storable in a storage medium, e.g. in a memory of a computerised device.

In a further aspect, the present invention further relates also to a computerised device or platform comprising computerised resources (e.g. one or more microprocessors) configured to execute software instructions to carry out the method, according to the invention.

Such a computerised device or platform may have various data processing architectures, according to the needs, e.g. centralised, multi-level or distributed data processing architectures.

Such a computerised device or platform may be installed on the field or be in a remote location with respect to the equipment S or be distributed on different field or remote devices.

The method, according to the invention, allows obtaining diagnostic information on the actual health conditions of the equipment S and identifying possible faults in the equipment S.

The method, according to the invention, allows obtaining prognostic information on the future health conditions of the equipment S, thereby allowing predicting the performances and health conditions of the equipment S over time.

The method, according to the invention, allows identifying and prescribing the most appropriate maintenance actions to avoid or mitigate potential failures (i.e. prescriptive analytics).

The method, according to the invention, allows obtaining a quantitative evaluation of the accuracy of the calculations carried out to assess the health conditions of the equipment S, thereby providing a feedback on the overall quality of the assessment activity.

The method, according to the present invention, is particularly adapted to be implemented by various computerised architectures and it is easily scalable and tunable in accordance to the characteristics of the equipment S and on the available input data $D_{IN}$.

The method, according to the invention, can thus be easily implemented at industrial level, at competitive costs with the currently available technical solutions.

The invention claimed is:

1. A method for assessing health conditions of industrial equipment (S), said equipment having one or more determined failure modes ($F_1, \ldots, F_N$), each of said failure modes having one or more determined failure causes ($FC_{D1}, \ldots, FC_{DK}$) and/or one or more undetermined failure causes ($FC_{U1}, \ldots, FC_{UM}$), comprises:
acquiring input data ($D_{IN}$) related to said equipment;
calculating failure mode assessment data ($R_{Fi}$, $RUL_{Fi}$, $A_{Fi}$, $RSK_{Fi}$, $POF_{Fi}$) for each failure mode ($F_i$) determined for said equipment, wherein the calculation of said failure mode assessment data comprises:
if said failure mode ($F_i$) has one or more determined failure causes ($FC_{D1}, \ldots, FC_{DK}$):
executing a first calculation procedure to calculate failure cause assessment data ($R_{FCj}$, $RUL_{FCj}$, $A_{FCj}$) for each failure cause ($FC_{Dj}$) determined for said failure mode, said failure cause assessment data being calculated on the basis of said input data ($D_{IN}$);
calculating said failure mode assessment data on the basis of the failure cause assessment data ($R_{FCj}$, $RUL_{FCj}$, $A_{FCj}$) calculated for each failure cause ($FC_{Dj}$) determined for said failure mode;
if said failure mode ($F_i$) has one or more undetermined failure causes ($FC_{U1}, \ldots, FC_{UM}$), executing a second calculation procedure to calculate said failure mode assessment data, said failure mode assessment data being calculated on the basis of said input data ($D_{IN}$);
calculating system assessment data ($R_S$, $RUL_S$, $A_S$, $RSK_S$, $POF_S$) for said equipment, said system assessment data being calculated on the basis of said failure mode assessment data ($R_{Fi}$, $RUL_{Fi}$, $A_{Fi}$, $RSK_{Fi}$, $POF_{Fi}$).

2. The method, according to claim 1, wherein said failure cause assessment data comprises a first failure cause assessment value ($R_{FCj}$) indicative of a probability that said failure cause ($FC_{Dj}$) does lead to a failure of said equipment within an operation time window, a second failure cause assessment value ($RUL_{FCj}$) indicative of an intervention time window to prevent the occurrence of said failure cause in said equipment, a third failure cause assessment value ($A_{FCj}$) indicative of a recommended intervention action on said equipment to prevent the occurrence of said failure cause.

3. The method according to claim 2, wherein said first calculation procedure comprises:
if monitoring data (NCMD, CMD) related to the operating life of said equipment are not available:
selecting first reliability statistics data (REL1) related to the operating life of said equipment;
executing a first calculation session to calculate said failure cause assessment data ($R_{FCj}$, $RUL_{FCj}$, $A_{FCj}$) on the basis of said first reliability statistics data (REL1);
if said monitoring data are available and continuous monitoring data (CMD) related to the operating life of said equipment are not available;
selecting second reliability statistics data (REL2) related to the operating life of said equipment;
executing a second calculation session to calculate said failure cause assessment data ($R_{FCj}$, $RUL_{FCj}$, $A_{FCj}$) on the basis of said second reliability statistics data (REL2) and on the basis of non-continuous monitoring data (NCMD) comprised in said monitoring data;
if said continuous monitoring data (CMD) are available, executing a third calculation session to calculate said failure cause assessment data ($R_{FCj}$, $RUL_{FCj}$, $A_{FCj}$) on the basis of said continuous monitoring data.

4. The method according to claim 3, wherein said first calculation session comprises:
calculating a first conditional reliability function (CRF1) for said failure cause ($FC_{Dj}$) on the basis of said first reliability statistics data (REL1);
calculating said failure cause assessment data ($R_{FCj}$, $RUL_{FCj}$, $A_{FCj}$) on the basis of said first conditional reliability function.

5. The method according to claim 2, wherein said failure mode assessment data comprises a first failure mode assessment value ($R_{Fi}$) indicative of a reliability of said equipment in relation to said failure mode ($F_i$), a second failure mode assessment value ($RUL_{Fi}$) indicative of a remaining useful life of said equipment in relation to said failure mode, a third failure mode assessment value ($A_{Fi}$) indicative of a recommended intervention action on said equipment to prevent the occurrence of a failure in relation to said failure mode, a fourth failure mode assessment value ($POF_{Fi}$) indicative of a probability that said failure mode leads to a failure within said operation time window, a fifth failure mode assessment value ($RSK_{Fi}$) indicative of a risk of failure for said equipment in relation to said failure mode.

6. The method according to claim 2, wherein said system assessment data comprises a first system assessment value ($R_S$) indicative of a reliability of said equipment, a second system assessment value ($RUL_S$) indicative of a remaining useful life of said equipment, a third system assessment value ($A_S$) indicative of a recommended intervention action on said equipment to prevent the occurrence of a failure, a fourth system assessment value ($POF_S$) indicative of a probability that a failure occurs in said equipment within said operation time window, a fifth failure mode assessment value ($RSK_S$) indicative of a risk of failure for said equipment, a sixth failure mode assessment value ($HI_S$) indicative of a health level of said equipment.

7. The method, according to claim 1, wherein said failure mode assessment data comprises a first failure mode assessment value ($R_{Fi}$) indicative of a reliability of said equipment in relation to said failure mode ($F_i$), a second failure mode assessment value ($RUL_{Fi}$) indicative of a remaining useful life of said equipment in relation to said failure mode, a third failure mode assessment value ($A_{Fi}$) indicative of a recommended intervention action on said equipment to prevent the occurrence of a failure in relation to said failure mode, a fourth failure mode assessment value ($POF_{Fi}$) indicative of a probability that said failure mode leads to a failure within said operation time window, a fifth failure mode assessment value ($RSK_{Fi}$) indicative of a risk of failure for said equipment in relation to said failure mode.

8. The method according to claim 7, wherein said system assessment data comprises a first system assessment value ($R_S$) indicative of a reliability of said equipment, a second system assessment value ($RUL_S$) indicative of a remaining useful life of said equipment, a third system assessment value ($A_S$) indicative of a recommended intervention action on said equipment to prevent the occurrence of a failure, a fourth system assessment value ($POF_S$) indicative of a probability that a failure occurs in said equipment within said operation time window, a fifth failure mode assessment value ($RSK_S$) indicative of a risk of failure for said equipment, a sixth failure mode assessment value ($HI_S$) indicative of a health level of said equipment.

9. The method, according to claim 1, wherein said system assessment data comprises a first system assessment value ($R_S$) indicative of a reliability of said equipment, a second system assessment value ($RUL_S$) indicative of a remaining useful life of said equipment, a third system assessment value ($A_S$) indicative of a recommended intervention action on said equipment to prevent the occurrence of a failure, a fourth system assessment value ($POF_S$) indicative of a probability that a failure occurs in said equipment within said operation time window, a fifth failure mode assessment value ($RSK_S$) indicative of a risk of failure for said equipment, a sixth failure mode assessment value ($HI_S$) indicative of a health level of said equipment.

10. The method, according to claim 1, wherein said first calculation procedure comprises:
   if monitoring data (NCMD, CMD) related to the operating life of said equipment are not available:
   selecting first reliability statistics data (REL1) related to the operating life of said equipment;
   executing a first calculation session to calculate said failure cause assessment data ($R_{FCj}$, $RUL_{FCj}$, $A_{FCj}$) on the basis of said first reliability statistics data (REL1);
   if said monitoring data are available and continuous monitoring data (CMD) related to the operating life of said equipment are not available;
   selecting second reliability statistics data (REL2) related to the operating life of said equipment;
   executing a second calculation session to calculate said failure cause assessment data ($R_{FCj}$, $RUL_{FCj}$, $A_{FCj}$) on the basis of said second reliability statistics data (REL2) and on the basis of non-continuous monitoring data (NCMD) comprised in said monitoring data;
   if said continuous monitoring data (CMD) are available, executing a third calculation session to calculate said failure cause assessment data ($R_{FCj}$, $RUL_{FCj}$, $A_{FCj}$) on the basis of said continuous monitoring data.

11. The method, according to claim 10, wherein said first calculation session comprises:
   calculating a first conditional reliability function (CRF1) for said failure cause ($FC_{Dj}$) on the basis of said first reliability statistics data (REL1);
   calculating said failure cause assessment data ($R_{FCj}$, $RUL_{FCj}$, $A_{FCj}$) on the basis of said first conditional reliability function.

12. The method, according to claim 10, wherein said second calculation session comprises:
   calculating first status data (SD1) related to the operating status of said equipment of the base of said non-continuous monitoring data (NCMD);
   calculating a second conditional reliability function (CRF2) for said failure cause ($FC_{Dj}$) on the basis of said second reliability statistics data (REL2);
   calculating a third conditional reliability function (CRF3) for said failure cause by modifying said second conditional reliability function on the basis of said first status data;
   calculating said failure cause assessment data ($R_{FCj}$, $RUL_{FCj}$, $A_{FCj}$) on the basis of said third conditional reliability function.

13. The method, according to claim 10, wherein said third calculation session comprises:
   calculating second status data (SD2) related to the operating status of said equipment of the base of said continuous monitoring data (CMD);
   calculating said failure cause assessment data ($R_{FCi}$, $RUL_{FCi}$, $A_{FCi}$) on the basis of said second status data.

14. The method, according to claim 1, wherein second calculation procedure comprises the following steps:
   if monitoring data (NCMD, CMD) related to the operating life of said equipment are not available:
   selecting third reliability statistics data (REL3) related to the operating life of said equipment;
   executing a fourth calculation session to calculate said failure mode assessment data ($R_{Fi}$, $RUL_{Fi}$, $A_{Fi}$, $RSK_{Fi}$, $POF_{Fi}$) on the basis of said third reliability statistics data (REL3);
   if said monitoring data are available and continuous monitoring data (CMD) related to the operating life of said equipment are not available;
   selecting fourth reliability statistics data (REL4) related to the operating life of said equipment;
   executing a fifth calculation session to calculate said failure mode assessment data ($R_{Fi}$, $RUL_{Fi}$, $A_{Fi}$, $RSK_{Fi}$, $POF_{Fi}$) on the basis of said fourth reliability statistics data (REL4) and on the basis of non-continuous monitoring data (NCMD) comprised in said monitoring data;
   if said continuous monitoring data (CMD) are available, executing a sixth calculation session to calculate said failure mode assessment data ($R_{Fi}$, $RUL_{Fi}$, $A_{Fi}$, $RSK_{Fi}$, $POF_{Fi}$) on the basis of said continuous monitoring data.

15. The method, according to claim 14, wherein said fourth calculation session comprises:
   calculating a fourth conditional reliability function (CRF4) for said failure mode ($F_i$) on the basis of said third reliability statistics data (REL3);

calculating said failure mode assessment data ($R_{Fi}$, $RUL_{Fi}$, $A_{Fi}$, $RSK_{Fi}$, $POF_{Fi}$) on the basis of said fourth conditional reliability function.

16. The method, according to claim 14, wherein said fifth calculation session comprises:
calculating third status data (SD3) related to the operating status of said equipment of the base of said non-continuous monitoring data (NCMD);
calculating a fifth conditional reliability function (CRF5) for said failure mode ($F_i$) on the basis of said fourth reliability statistics data (REL4);
calculating a sixth conditional reliability function (CRF6) for said failure mode by modifying said fifth conditional reliability function on the basis of said third status data;
calculating said failure mode assessment data ($R_{Fi}$, $RUL_{Fi}$, $A_{Fi}$, $RSK_{Fi}$, $POF_{Fi}$) on the basis of said sixth conditional reliability function.

17. The method, according to claim 14, wherein said sixth calculation session comprises:
calculating fourth status data (SD4) related to the operating status of said equipment of the base of said continuous monitoring data;
calculating said failure mode assessment data ($R_{Fi}$, $RUL_{Fi}$, $A_{Fi}$, $RSK_{Fi}$, $POF_{Fi}$) on the basis of said fourth status data.

18. The method, according to claim 1, wherein it comprises the step of calculating accuracy data ($Acc_S$) indicative of the accuracy of said system assessment data ($R_S$, $RUL_S$, $A_S$, $RSK_S$, $POF_S$), said accuracy data being calculated when monitoring data (NCMD, CMD) related to the operating life of said equipment are available.

19. A storage medium comprising:
a set of software instructions executable by a processing resource effective to:
acquire input data ($D_{IN}$) related to industrial equipment having one or more determined failure modes ($F_1, \ldots, F_N$), each of said failure modes having one or more determined failure causes ($FC_{D1}, \ldots, FC_{DK}$) and/or one or more undetermined failure causes ($FC_{U1}, \ldots, FC_{UM}$);
calculate failure mode assessment data ($R_{Fi}$, $RUL_{Fi}$, $A_{Fi}$, $RSK_{Fi}$, $POF_{Fi}$) for each failure mode ($F_i$) determined for said equipment, wherein the calculation of said failure mode assessment data comprises:
if said failure mode ($F_i$) has one or more determined failure causes ($FC_{D1}, \ldots, FC_{DK}$):
execute a first calculation procedure to calculate failure cause assessment data ($R_{FCj}$, $RUL_{FCj}$, $A_{FCj}$) for each failure cause ($FC_{Dj}$) determined for said failure mode, said failure cause assessment data being calculated on the basis of said input data ($D_{IN}$);
calculate said failure mode assessment data on the basis of the failure cause assessment data ($R_{FCj}$, $RUL_{FCj}$, $A_{FCj}$) calculated for each failure cause ($FC_{Dj}$) determined for said failure mode;
if said failure mode ($F_i$) has one or more undetermined failure causes ($FC_{U1}, \ldots, FC_{UM}$), execute a second calculation procedure to calculate said failure mode assessment data, said failure mode assessment data being calculated on the basis of said input data ($D_{IN}$); and
calculate system assessment data ($R_S$, $RUL_S$, $A_S$, $RSK_S$, $POF_S$) for said equipment, said system assessment data being calculated on the basis of said failure mode assessment data ($R_{Fi}$, $RUL_{Fi}$, $A_{Fi}$, $RSK_{Fi}$, $POF_{Fi}$).

20. A computerized device for monitoring a health status of industrial equipment comprising:
a microprocessor configured to execute a set of instructions stored on a storage medium effective to:
acquire input data ($D_{IN}$) related to industrial equipment having one or more determined failure modes ($F_1, \ldots, F_N$), each of said failure modes having one or more determined failure causes ($FC_{D1}, \ldots, FC_{DK}$) and/or one or more undetermined failure causes ($FC_{U1}, \ldots, FC_{UM}$);
calculate failure mode assessment data ($R_{Fi}$, $RUL_{Fi}$, $A_{Fi}$, $RSK_{Fi}$, $POF_{Fi}$) for each failure mode ($F_i$) determined for said equipment, wherein the calculation of said failure mode assessment data comprises:
if said failure mode ($F_i$) has one or more determined failure causes ($FC_{D1}, \ldots, FC_{DK}$):
execute a first calculation procedure to calculate failure cause assessment data ($R_{FCj}$, $RUL_{FCj}$, $A_{FCj}$) for each failure cause ($FC_{Dj}$) determined for said failure mode, said failure cause assessment data being calculated on the basis of said input data ($D_{IN}$);
calculate said failure mode assessment data on the basis of the failure cause assessment data ($R_{FCj}$, $RUL_{FCj}$, $A_{FCj}$) calculated for each failure cause ($FC_{Dj}$) determined for said failure mode;
if said failure mode ($F_i$) has one or more undetermined failure causes ($FC_{U1}, \ldots, FC_{UM}$), execute a second calculation procedure to calculate said failure mode assessment data, said failure mode assessment data being calculated on the basis of said input data ($D_{IN}$); and
calculate system assessment data ($R_S$, $RUL_S$, $A_S$, $RSK_S$, $POF_S$) for said equipment, said system assessment data being calculated on the basis of said failure mode assessment data ($R_{Fi}$, $RUL_{Fi}$, $A_{Fi}$, $RSK_{Fi}$, $POF_{Fi}$).

* * * * *